Dec. 3, 1935.   S. M. WOODWARD   2,022,753
WEIGHING SCALE
Filed Aug. 28, 1935
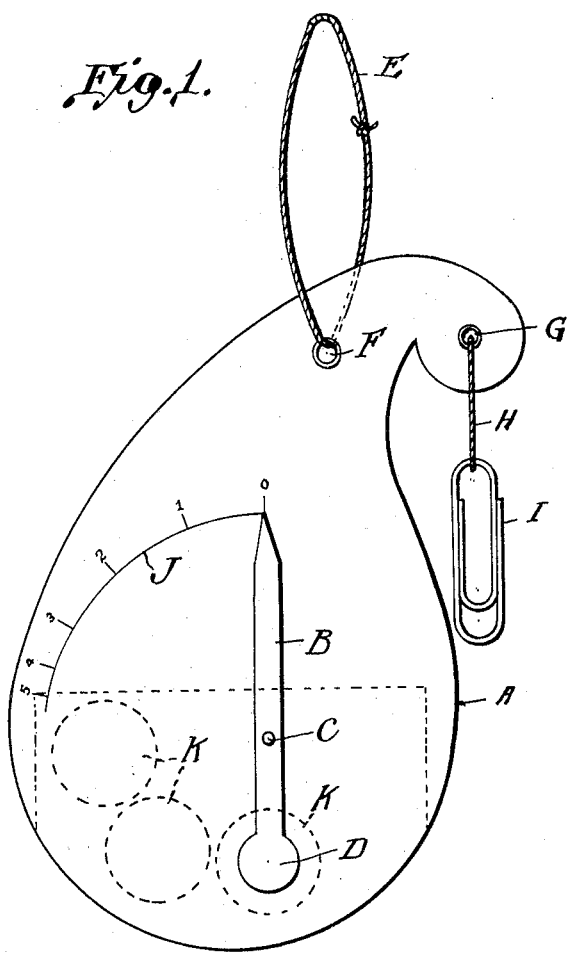
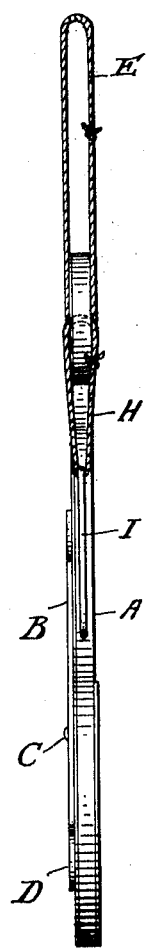
Inventor:

Patented Dec. 3, 1935

2,022,753

UNITED STATES PATENT OFFICE 2,022,753

WEIGHING SCALE

Stewart M. Woodward, Richmond, Va.

Application August 28, 1935, Serial No. 38,221

1 Claim. (Cl. 265—61)

This invention relates to improvement in weighing scales designed for weighing light articles, especially letters and other mail matter; and it has for its object to provide a simple, convenient and inexpensive weighing device that can be manufactured sufficiently cheaply to permit its extensive use for advertising purposes, and that will prove useful and valuable to the recipient; and, furthermore, to construct said weighing device in such manner that the weight of the portion thereof intended to be distributed extensively through the mails can be made sufficiently light to insure to the sender the minimum cost in postage for such distribution, and likewise in such manner that the necessary additional weight can readily be supplied by any recipient thereof.

One form of this invention is illustrated in the accompanying drawing, in which Figure 1 shows the scale in its preferred form in front elevation. Figure 2 is a right-hand edge view of Figure 1. Briefly, I provide a light, inexpensive plate of cardboard, corrugated board, fiberboard, celluloid, wood, aluminum, or other thin, light material, through which I provide two fulcrum pivots, from one of which the plate is to be suspended with the body of the plate acting as a counterweight or pendulous mass, the article to be weighed being suspended from the other fulcrum. Deflection of the plate due to the weight of the article is indicated by a pendulous pointer carried on the plate. The plate may either be of the shape shown in the drawing or such other shape as will permit the scale to operate substantially as herein described.

Referring to the drawing, the plate A is to be suspended by a cord or wire loop or other suitable support E, through a hole or fulcrum F, preferably having a metal eyelet to eliminate wear and lessen friction. From a hole or fulcrum G, also preferably having a metal eyelet for the same reason, is to be suspended a cord or wire loop or other suitable pendant H, preferably supporting a metal clip or holder I which may either be an ordinary wire paper-clip or other suitable device for holding suspended the article to be weighed. The positions of the two fulcrums are such that the weight of the article to be weighed tends to rotate the plate A about the fulcrum F. The pointer B, made of metal or other suitable material, with the lower end D sufficiently heavy to cause the pointer to retain a perpendicular position, is attached to the plate A by a pivot C on which it should move freely. Along the arc J, made by the point of the pointer B as it moves when articles are being weighed, indicia are to be shown on the plate A indicating in figures the number of ounces or fractions representing the weight of the article.

In the plate A, in such positions as to obtain the most satisfactory counter-balancing leverage in relation to the fulcrums F and G, one or more pockets or recesses K are to be formed in or through the plate A to receive unworn coins for use as weights. These coins, preferably copper cents, to be fitted in snugly and held securely in position in the pockets or recesses, preferably by sheets of paper attached to each side of the plate, the paper on one side to be gummed and left loose over that portion of the plate containing the pockets or recesses in such manner that the flap can be pasted down after the coins have been inserted. Advertising matter may be shown on either or both sides of plate A as may be desired.

As will readily be seen, a weighing scale so designed and constructed will possess the novel features and important advantages (a) that prior to the completion of the device, through the insertion by the recipient of the necessary unworn coins for use as weights, which may later be reclaimed if desired, the exceedingly light weight of the plate and its attachments will permit its wide distribution by mail at a minimum cost in postage to the sender, which would not be the case were the plate made sufficiently heavy to operate as a weighing scale without the necessity of such weights being added, and (b) that the use of the proper unworn coins by the recipient for adding the required weight to the plate will insure to each such recipient a readily available means of supplying weights that will be accurate and uniform for completing the device and making it ready to perform its function as a weighing scale.

Various changes in the shape of the plate and in its proportions, and in details of construction, may be made without departing from the principle or sacrificing any of the novelty or the advantages of the invention.

Having thus briefly described my invention, I claim:

In a weighing scale of the kind described, in combination, a thin plate of cardboard or other relatively light material, preferably of gourd-like outline or other similar shape; a suspension fulcrum comprising an opening formed in said plate in such manner that the plate constitutes a pendulous body; a second fulcrum formed in said plate for the suspension of an article to be weighed, this fulcrum being so disposed that the article being weighed tends to pivot the plate about said first fulcrum; a loop of flexible cord or other suitable material passing through the first fulcrum for suspending the plate; another loop of flexible cord or other suitable material passing through the second fulcrum for supporting a metal clip or other suitable holder for suspending the article to be weighed; a pendulous pointer pivoted to the plate and pointing to indicia on the plate showing in figures the weight of the article to be weighed; pockets or recesses in the plate for receiving unworn coins to be used as weights, said pockets or recesses to be so located that after the coins have been inserted the proper counterbalancing leverage in relation to the two fulcrums will be obtained for operating the device as a weighing scale.

STEWART M. WOODWARD.